United States Patent
Wilder et al.

(10) Patent No.: US 11,831,720 B2
(45) Date of Patent: Nov. 28, 2023

(54) TEST RESULTS TRANSFER PROTOCOL

(71) Applicant: ContiTech USA, Inc., Fairlawn, OH (US)

(72) Inventors: Michael Wilder, Valparaiso, IN (US); Dustin Kendall, Marysville, TN (US); Cameron Banga, Valparaiso, IN (US)

(73) Assignee: ContiTech USA, Inc., Fairlawn, OH (US)

( * ) Notice: Subject to any disclaimer, the term of this patent is extended or adjusted under 35 U.S.C. 154(b) by 187 days.

(21) Appl. No.: 17/305,697

(22) Filed: Jul. 13, 2021

(65) Prior Publication Data

US 2023/0013614 A1    Jan. 19, 2023

(51) Int. Cl.
H04L 29/08 (2006.01)
H04L 67/125 (2022.01)
G01N 3/12 (2006.01)
G01M 99/00 (2011.01)

(52) U.S. Cl.
CPC ........... *H04L 67/125* (2013.01); *G01M 99/00* (2013.01); *G01N 3/12* (2013.01); *G01N 2203/0048* (2013.01)

(58) Field of Classification Search
CPC ....... H04L 67/125; G01M 99/00; G01N 3/12; G01N 2203/0048; H04W 4/70
See application file for complete search history.

(56) References Cited

U.S. PATENT DOCUMENTS

| 8,479,776 | B2 | 7/2013 | Berardi | |
|---|---|---|---|---|
| 9,526,886 | B2 | 12/2016 | Mastri et al. | |
| 11,193,847 | B1* | 12/2021 | Francis | G01M 3/002 |
| 2009/0150325 | A1* | 6/2009 | De | G06N 7/01 |
| | | | | 715/764 |
| 2009/0165424 | A1* | 7/2009 | Lutz | G01L 19/0007 |
| | | | | 53/289 |
| 2010/0174495 | A1* | 7/2010 | Pereira | G01M 5/0033 |
| | | | | 702/34 |
| 2010/0326156 | A1* | 12/2010 | Hoskins | H01R 43/0486 |
| | | | | 72/21.5 |
| 2013/0131855 | A1 | 5/2013 | Intagliata et al. | |
| 2015/0233791 | A1* | 8/2015 | Ratilla | G01M 99/00 |
| | | | | 702/188 |
| 2016/0305590 | A1 | 10/2016 | Li | |
| 2016/0335816 | A1* | 11/2016 | Thoppae | G07C 5/0841 |

(Continued)

OTHER PUBLICATIONS

International Search Report and Written Opinion dated Oct. 5, 2022 of International Application PCT/US2022/073487 on which this application claims priority.

*Primary Examiner* — An T Nguyen
(74) *Attorney, Agent, or Firm* — Gregory Adams; Richard A. Wolf

(57) ABSTRACT

A system for communicating hose test information using a test results transfer protocol (TRTP) is disclosed. The system also includes a network interface. The system also includes a memory storage. The system also includes one or more processors configured to: initialize a plurality of status words according to the TRTP, generate a payload array configuration having a number of payloads in a payload array and a number of registers, generate the payload array having hose test result information according to the TRTP, and provide the generated payload array to the network interface for transmission.

20 Claims, 10 Drawing Sheets

200

| Payload Register 1 | Time Stamp High | Binary |
|---|---|---|
| Payload Register 2 | Time Stamp Low | Binary |
| Payload Register 3 | Air Press Feedback | Binary |
| Payload Register 4 | Air Press Control | Binary |
| Payload Register 5 | Press 1 | Binary |
| Payload Register 6 | Press 2 | Binary |
| Payload Register 7 | Sensor 1 | Binary |
| Payload Register 8 | Sensor 2 | Binary |
| Payload Register 9 | Status Word 1 | 16 Bits |
| Payload Register 10 | Status Word 2 | 16 Bits |
| Payload Register 11 | Status Word 3 | 16 Bits |
| Payload Register 12 | Status Word 4 | 16 Bits |

(56) References Cited

U.S. PATENT DOCUMENTS

| | | | |
|---|---|---|---|
| 2017/0160124 A1* | 6/2017 | Drachmann | G01F 25/10 |
| 2019/0316737 A1* | 10/2019 | Boker | F17D 3/00 |
| 2020/0011463 A1 | 1/2020 | Gilbreath et al. | |
| 2020/0086121 A1 | 3/2020 | Miller et al. | |
| 2020/0200306 A1 | 6/2020 | Bennett et al. | |
| 2021/0372094 A1* | 12/2021 | Al-Muslim | G01M 5/0025 |
| 2023/0013614 A1* | 1/2023 | Wilder | H04L 67/125 |

\* cited by examiner

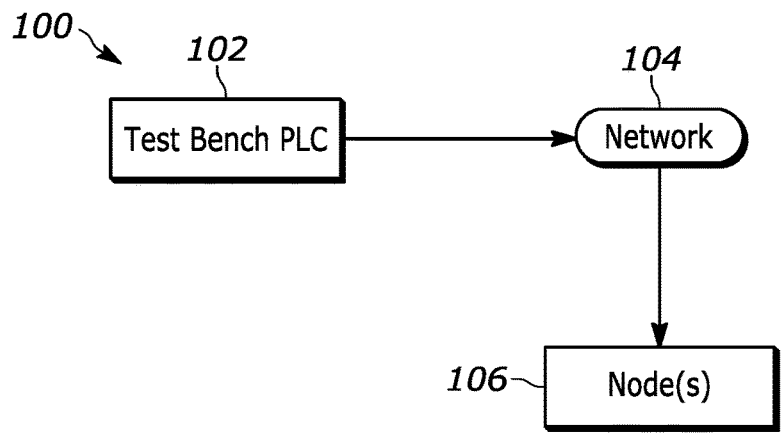

FIG. 1

| Payload Register 1 | Time Stamp High | Binary |
|---|---|---|
| Payload Register 2 | Time Stamp Low | Binary |
| Payload Register 3 | Air Press Feedback | Binary |
| Payload Register 4 | Air Press Control | Binary |
| Payload Register 5 | Press 1 | Binary |
| Payload Register 6 | Press 2 | Binary |
| Payload Register 7 | Sensor 1 | Binary |
| Payload Register 8 | Sensor 2 | Binary |
| Payload Register 9 | Status Word 1 | 16 Bits |
| Payload Register 10 | Status Word 2 | 16 Bits |
| Payload Register 11 | Status Word 3 | 16 Bits |
| Payload Register 12 | Status Word 4 | 16 Bits |

FIG. 2

| Purpose | Function | Status Word | Status Bit |
|---|---|---|---|
| Function | Boot Up Idle | Status Word 1 | 1 |
| Function | Safe Mode Idle | Status Word 1 | 2 |
| Function | Emergency Shutdown | Status Word 1 | 3 |
| Function | Calibration Test | Status Word 1 | 4 |
| Function | Calibration Adjust | Status Word 1 | 5 |
| Function | Tare Adjust | Status Word 1 | 6 |
| Function | Initialize Test | Status Word 1 | 7 |
| Function | Hold Test With Pump Assist | Status Word 1 | 8 |
| Function | Hold Test Without Pump Assist | Status Word 1 | 9 |
| Function | Linear Pressure Test | Status Word 1 | 10 |
| Function | Incremental Pressure Test | Status Word 1 | 11 |
| Function | Shutdown | Status Word 1 | 12 |
| Function | Save Data To Array | Status Word 1 | 13 |
| Function | Pressure Stabilization | Status Word 1 | 14 |
| Function | Fill Pump | Status Word 1 | 15 |
| Function | Reserved For Future Development | Status Word 1 | 16 |
| Input | X0 - Estop | Status Word 2 | 1 |
| Input | X1 - Lid | Status Word 2 | 2 |
| Input | X2 - Fill Pump Auto Shutoff Detector | Status Word 2 | 3 |
| Input | X3 - Interlock/ Extra Door Switch | Status Word 2 | 4 |

FIG. 3

| | | | |
|---|---|---|---|
| Input | X4 - Trough Lid | Status Word 2 | 5 |
| Input | X5 - Pressure Up | Status Word 2 | 6 |
| Input | X6 - Pressure Down | Status Word 2 | 7 |
| Output | Y0 - Status: Machine Idle (Not In Use) | Status Word 2 | 8 |
| Output | Y1 - Fill Pump | Status Word 2 | 9 |
| Output | Y2 - Status: System Pressurized | Status Word 2 | 10 |
| Output | Y3 - Status: Test In Progress | Status Word 2 | 11 |
| Output | Y4 - Shutoff Valve 1 | Status Word 2 | 12 |
| Output | Y5 - Dump Valve 1 | Status Word 2 | 13 |
| Output | Y6 - Pump 1 | Status Word 2 | 14 |
| Output | Y7 - Isolation Valve 1 | Status Word 2 | 15 |
| Output | Y10 - Test Complete | Status Word 2 | 16 |
| Output | Y11 - Reserved | Status Word 3 | 1 |
| Output | Y12 - Shutoff Valve 2 | Status Word 3 | 2 |
| Output | Y13 - Dump Valve 2 | Status Word 3 | 3 |
| Output | Y14 - Pump 2 | Status Word 3 | 4 |
| Output | Y15 - Isolation Valve 2 | Status Word 3 | 5 |
| Output | Y16 - Reserved | Status Word 3 | 6 |
| Output | Y17 - Reserved | Status Word 3 | 7 |
| Test | Test Begin | Status Word 3 | 8 |
| Test | Test In Process | Status Word 3 | 9 |
| Test | Test Completed | Status Word 3 | 10 |

FIG. 3 (Continued)

| | | | |
|---|---|---|---|
| Test | Test Canceled | Status Word 3 | 11 |
| Test | Test Passed | Status Word 3 | 12 |
| Boost | Pressure Boost | Status Word 3 | 13 |
| Boost | Stabilize Pressure | Status Word 3 | 14 |
| Boost | Hold Pressure | Status Word 3 | 15 |
| Boost | Pressure Decay | Status Word 3 | 16 |
| Boost | Pressure Drop Failure | Status Word 4 | 1 |
| Boost | Target Pressure Reached | Status Word 4 | 2 |
| Boost | Max Pressure Reached | Status Word 4 | 3 |
| Boost | Initialize Boost | Status Word 4 | 4 |
| None | Reserved For Future Development | Status Word 4 | 5 |
| None | Reserved For Future Development | Status Word 4 | 6 |
| None | Reserved For Future Development | Status Word 4 | 7 |
| None | Reserved For Future Development | Status Word 4 | 8 |
| None | Reserved For Future Development | Status Word 4 | 9 |
| None | Reserved For Future Development | Status Word 4 | 10 |
| None | Reserved For Future Development | Status Word 4 | 11 |
| None | Reserved For Future Development | Status Word 4 | 12 |
| None | Reserved For Future Development | Status Word 4 | 13 |
| None | Reserved For Future Development | Status Word 4 | 14 |
| None | Reserved For Future Development | Status Word 4 | 15 |
| Internal | Data Copy Complete | Status Word 4 | 16 |

FIG. 3 (Continued)

TEST RESULTS TRANSFER PROTOCOL

FIELD

The disclosure generally relates to systems and methods for communication by testbenches and/or hose crimp stations using a test results transfer protocol (TRTP).

BACKGROUND

Industrial hoses are commonly used to transport hydraulic fluid, fluid, gas, solid, food, beverage, steam, petroleum, chemicals, gasses, and air. Additionally, these hoses are typically assembled with fittings to facilitate connection to vessels, other hoses, systems, tanks, tankers, other hoses, platforms and the like.

Hoses are typically assembled by crimping or attaching a fitting to an end of hose. This includes selecting a fitting and then attaching that fitting to the hose using a variety of parameters such as pressure, stress, temperature and the like. These parameters can be referred to as crimp parameters.

The hose assemblies can be tested over time to generating testing results. These results can be used to mitigate failure, determine maintenance, determine remaining lifetime and the like.

What is needed are techniques to facilitate communication of hose assembly related information.

BRIEF DESCRIPTION OF THE DRAWINGS

FIG. 1 is a diagram illustrating a TRTP communication system 100 for hose assemblies and test data in accordance with one or more embodiments.

FIG. 2 is a diagram illustrating a data organization or schema 200 for the TRTP in accordance with one or more embodiments.

FIG. 3 is a diagram illustrating a schema for status words 300 according to the TRTP in accordance with one or more embodiments.

DETAILED DESCRIPTION

Figure 4:
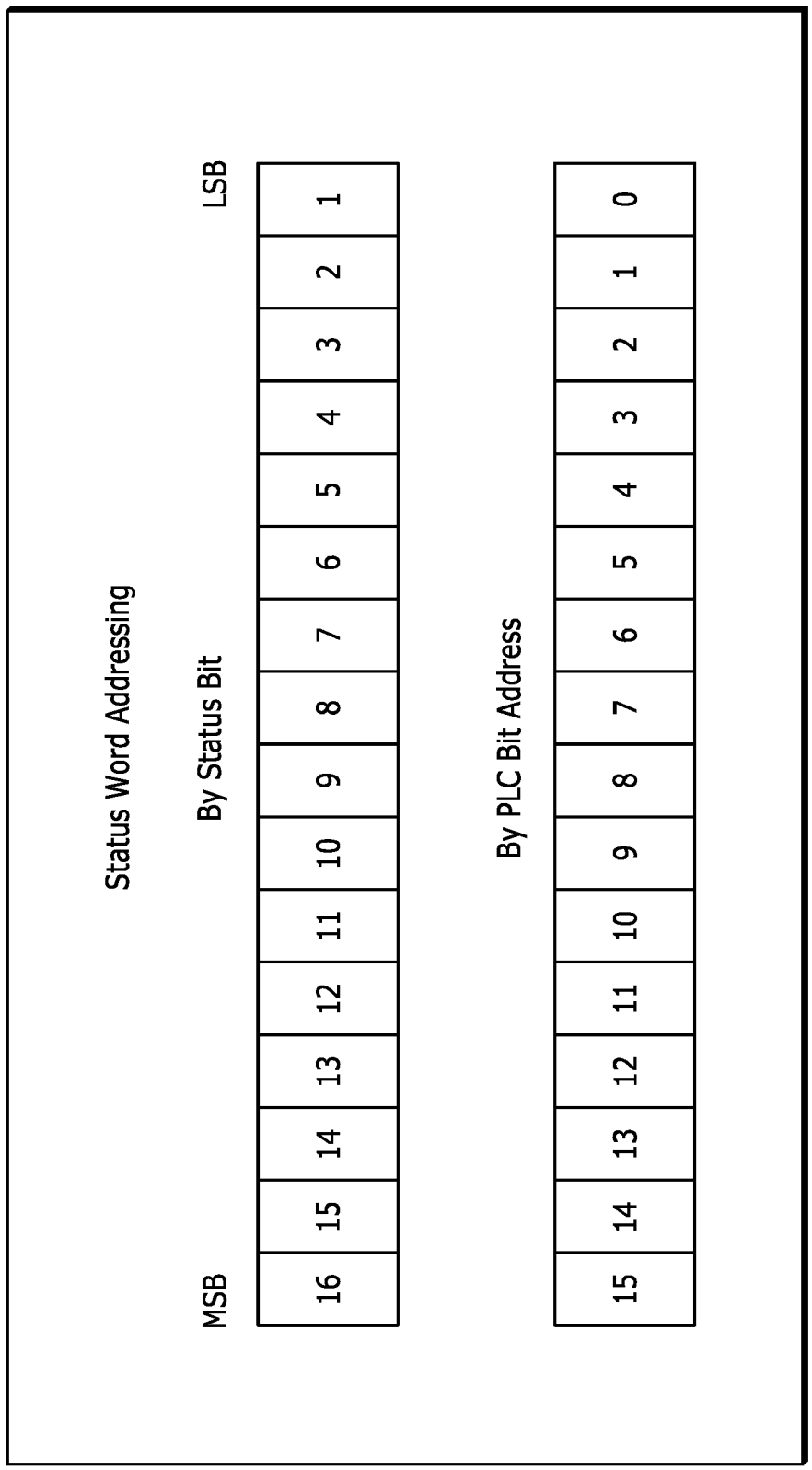
FIG. 4 is a diagram illustrating a data organization or schema 400 for status word addressing using the TRTP in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Industrial hoses are commonly used to transport hydraulic fluid, fluid, gas, solid, food, beverage, steam, petroleum, chemicals, gasses, and air. Additionally, these hoses are typically assembled with fittings to facilitate connection to vessels, other hoses, systems, tanks, tankers, other hoses, platforms and the like.

Hoses are typically assembled by crimping or attaching a fitting to an end of hose using crimp parameters, such as crimping force, pressure and the like.

One technique to obtain crimp parameters is to use a reference book. The reference book may be referenced based on hose material, hose size, and fitting type. This technique for assembly is only based on the hose and the fitting to be assembled.

Hoses, fittings and assembled hoses are used for/in a variety of conditions, uses or applications and the like. For example, a hose of one material may be used for petroleum whereas another hose of the same material is used for hot gases.

Additionally, hoses, fittings and assembled hoses have lifespans that can vary based on the use conditions and/or applications. For example, a hose used in extreme heat for a year will have a lower remaining lifespan than a similar hose used in moderate conditions.

Hoses are typically assembled by crimping or attaching a fitting to an end of hose. This includes selecting a fitting and then attaching that fitting to the hose using a variety of parameters such as pressure, stress, temperature and the like. These parameters can be referred to as crimp parameters.

The hose assemblies can be tested over time to generating testing results. These results can be used to mitigate failure, determine maintenance, determine remaining lifetime and the like.

The test results/data are typically merely printed on thermal paper. Other information is often generated by user filled out forms. There is generally a lack of traceability for a specific hose. The hose related information is merely maintained in paper records not available to other suppliers, customers, technicians and the like. Engineering support may be required to speculate or guess when an error or failure occurs.

What is needed are techniques to facilitate communication of hose and assembly related information.

Embodiments are disclosed that provide a variety of techniques to structure, arrange and/or provide hose related information. The techniques include a test results transfer protocol (TRTP) for crimping and assembly of hydraulic or industrial hoses. This information can include crimp parameters, crimp test parameters, testbench test results and the like.

The TRTP can facilitate generating reports from stored and transferred data, validating test results by reading stored and transferred data, troubleshooting products by recalling test results and machine states from transferred data, transferring test results to database tables for recall and analysis or business intelligence and product development.

The TRTP is used to send, receive, and store hose test data across a plurality of platforms in a unified format. The test data can be shared in a common format accessible to users, machines, software programs and the like. Using the TRTP can mitigate error and human error encountered by other approaches.

It is appreciated that suitable variations in the TRTP can be used for varied systems, common test data results, and private data formats for transferring of vendor specific machine data.

End users or consumers are enabled to view that a hose was tested including specific test and machine state events that occurred during a test; pressures and other user defined recorded test data with time stamps; and the ability to recreate the test and visually display (graph) the results in selected resolutions. The TRTP permits detailed stored data to be communicated and interpreted correctly on other devices and platforms.

Additionally, the integrity, granularity and longevity of test data is valuable to consumers and suppliers. Transferring and storing test data in accordance with TRTP standards enables traceability for a particular hose's history and facilitates mutual accountability between hose suppliers and customers.

It is appreciated that the TRTP can be used with hoses in a variety of applications including, but not limited to, hydraulics, industrial, food, beverage, sanitation, medical, oil, gas, mobile fluid, energy, automotive, mining and the like.

FIG. 1 is a diagram illustrating a TRTP communication system 100 for hose assemblies and test data in accordance with one or more embodiments. It is appreciated that the system 100 is provided for illustrative purposes and that suitable variations are contemplated.

The system 100 utilizes the TRTP for communication and storage of hose information including, but not limited to; test data, test results, crimp parameters, predicted lifespan, conditions and the like.

The system 100 includes a testbench programmable logic controller (PLC) 102, a network storage 104 and a plurality of nodes 106.

The network storage 104 includes cloud storage, network servers, databases and the like that can transfer, store, provide and maintain hose information.

The nodes 106 include testbenches, testing systems, crimpers, calibration systems, computer systems and the like.

The PLC 102 is typically an industrial computer that has been ruggedized and adapted for the control of manufacturing processes, such as assembly lines, robotic devices, or any activity that requires high reliability, ease of programming, and process fault diagnosis.

The PLC 102 generally includes one or more inputs and outputs (I/O) and includes network interfaces and the like.

The PLC 102 is ruggedized and configured to operate without degradation by environmental factors, such as extended temperature ranges, electrical noise, vibration, impact and the like.

The PLC 102 can be battery powered.

The PLC 102 can utilize volatile and/or non-volatile memory.

It is appreciated that other suitable processor based systems can be used in place of the PLC 102.

The PLC 102 uses the TRTP to communicate hose information. The PLC 102 uses TRTP to communicate status of test points that include, for example, time stamp(s), sensor data, Boolean PLC state information, a validity flag, summary test data and the like. The TRTP includes data schema, data payload, data payload arrays, processing of payload data, tablet code payload processing, tablet programming work flow, function calls and the like.

The PLC 102 is configured to communicate with the nodes 106 at least partially using the TRTP.

FIG. 2 is a diagram illustrating a data organization or schema 200 for the TRTP in accordance with one or more embodiments. It is appreciated that the schema 200 is provided for illustrative purposes and that suitable variations are contemplated.

Test data from the hose testing is stored in a structure called data payload. The data payload is a 12 word (24 byte) structure of 12 values. These values describe the time, the pneumatic (air), hydraulic (water) pressures, sensors and up to 63 Boolean (on/off) values that describe the various states of the test bench operation. The values in the payload describe the processes going on inside the test bench during a small snapshot in time. FIG. 2 shows the layout of the PLC data payload.

A time stamp is divided into two parts: the high and low. It is measured in milliseconds and the maximum value from the PLC is 99999999 milliseconds=27.778 hours, just over one complete (24 hour) day of recording time.

Air pressure to control the pump is monitored two ways: the control (what pressure the PLC is requesting from the air regulator) and the feedback (what pressure the air regulator is responding with).

Pressure 1 is the main hydraulic pressure monitored for testing and control. It is the feedback from the main pressure transducer of the pump system.

Pressure 2, Sensors 1 and 2 are optional pressure and sensor data that can be added by the user and monitored.

Air pressures, pressures and sensors are measure in counts, the values returned by the analog to digital converters. The counts are converted into the proper unit of measure at the tablet based on the customer's settings. This simplifies the PLC programming and makes the data transfer quicker.

Air pressures are in the range of 0 to 4095 (12 bit).

Pressures and sensors are in the range of 0 to 65535 (16 bit).

The values (time stamp, air pressures, pressures and sensors) are in binary format to save data space and improve transmission and conversion time. The status words are 16 bit fields that represent on/off Boolean states. Each bit represents an on/off state for one particular function like an input, an output, or a PLC function. Up to 63 Boolean values can be recorded. The last bit field (15) of status word 4 is reserved for a test bit. The test bit is set at the very end of the PLC copying the payload to a memory array. When the tablet reads that bit and that bit is set, the tablet confirms that the payload copied entirely and is valid.

FIG. 3 is a diagram illustrating a schema for status words 300 according to the TRTP in accordance with one or more embodiments. It is appreciated that the schema 300 is provided for illustrative purposes and that suitable variations are contemplated.

Note, when addressing the bits, the index is zero based, so subtract 1 from the status bit value. For instance, a status bit of 10 would be indexed as 9.

FIG. 4 is a diagram illustrating a data organization or schema 400 for status word addressing using the TRTP in accordance with one or more embodiments. It is appreciated that the schema 400 is provided for illustrative purposes and that suitable variations are contemplated.

In the PLC 102, the least significant bit (LSB) will be on the right, and the most significant bit (MSB) on the left. That format will be held throughout the processing. Payload data exported will be in network byte order (little endian). Payload data is converted to the local machine. The transport of data between systems occurs in network byte order (big endian) to maintain compatibility with Internet standards and the like. Data is typically converted from native byte order to network byte order for transmission. After receiving a data packet, the receiving side typically converts from network byte order to native byte order. No byte order translation is required in some examples, such as vendor integrated systems where the byte order is consistent among the systems.

Figure 5:
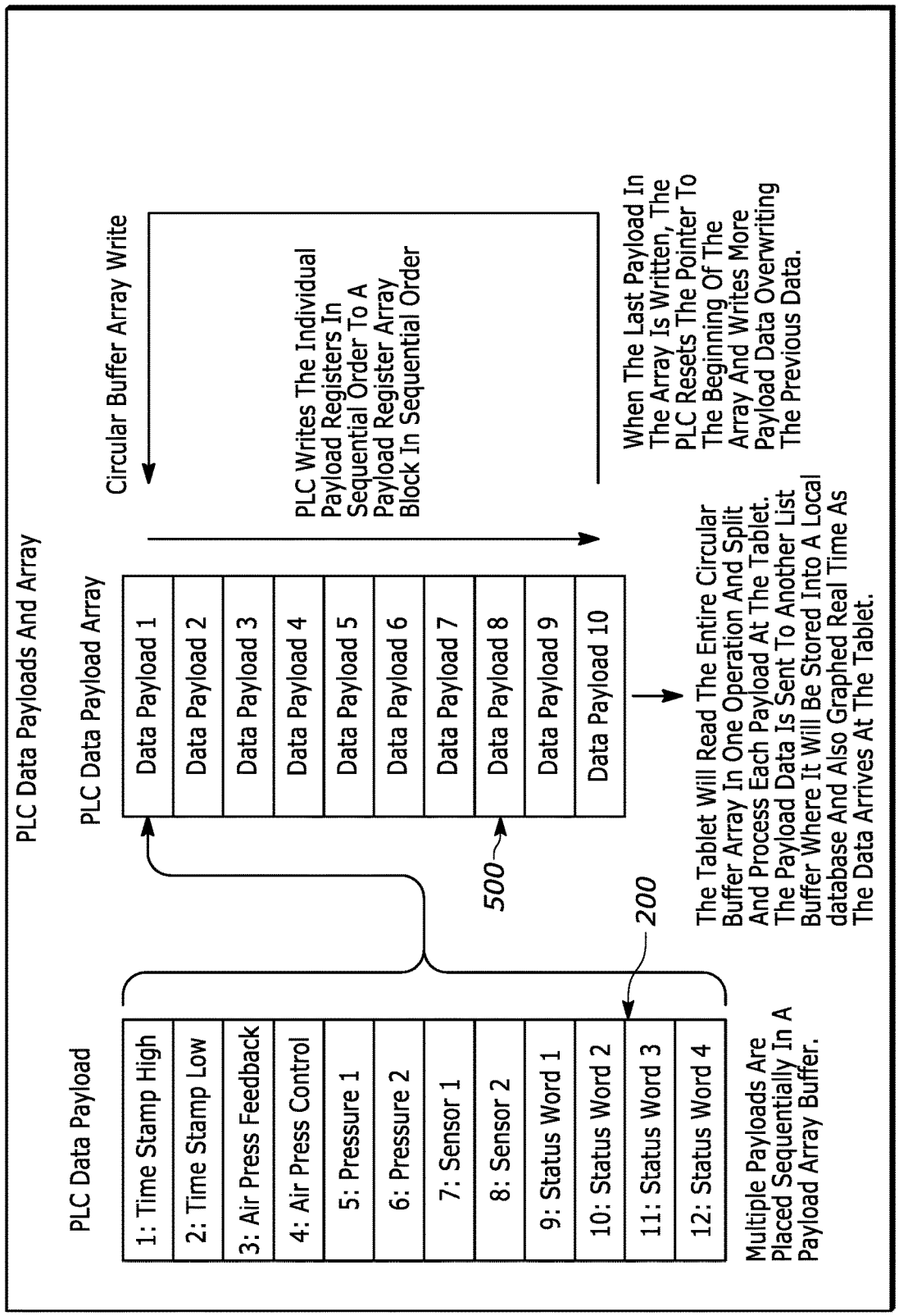
FIG. 5 is a diagram illustrating a data organization or schema 500 of data payload arrays for the TRTP in accordance with one or more embodiments.

FIG. 5 is a diagram illustrating a data organization or schema 500 of data payload arrays for the TRTP in accordance with one or more embodiments. It is appreciated that the schema 500 is provided for illustrative purposes and that suitable variations are contemplated.

The payloads are copied to a circular buffer within the PLC memory called the PLC data payload array. The array is flexible in size so long as it stays within the maximum Modbus remote transfer unit (RTU) data message size (256 bytes, 125 registers). Since the payload is 12 registers in length, the maximum number of payloads in the circular buffer is 10. This (10 pay loads) is the current number of payloads in the buffer.

The following paragraphs provide an example technical implementation of processing and utilizing TRTP data on our test bench device.

The size of the data payload and data payload array are configured in the tablet software in two locations. The values in these two locations equal each other. The locations in the tablet software are:

PLC config (PlcConfig.java) class:

NbrDataPayloadsInArray=number of payloads in the array, used to configure the PLC code NbrRegistersInPayload=number of registers in the payload, used to configure the PLC code Global Constants (GlobalConstants.java) class:

public static final int K_NBR_REGISTERS_IN_PLC_DATA_PAYLOAD=12;

public static final int K_NBR_DATA_PAYLOADS_IN_ARRAY=10;

The purpose of the payload array is to make it possible for the tablet to read the maximum amount of payload data in one communication read operation. It is appreciated from testing that the 12 register×10 payload array works well and can capture all or most of the payload data the PLC 102 generates. It is also appreciated that the capture ratio (payloads read into tablet/payloads PLC creates) is 98% to 99%, depending on the measurement technique used to measure the accuracy.

The PLC 102 generates payload data every cycle if the PLC stage 16 is enabled. Every cycle of the PLC will generate a new set of payload data. The interval of data generation from testing was calculated at an average 20 ms per cycle with a standard deviation of 3 ms. The probability of 50 data points per second with a 99% capture ratio is of extremely high confidence. The high data throughput performance has shown visually in the real time graphing and data feedback performance.

Figure 6:
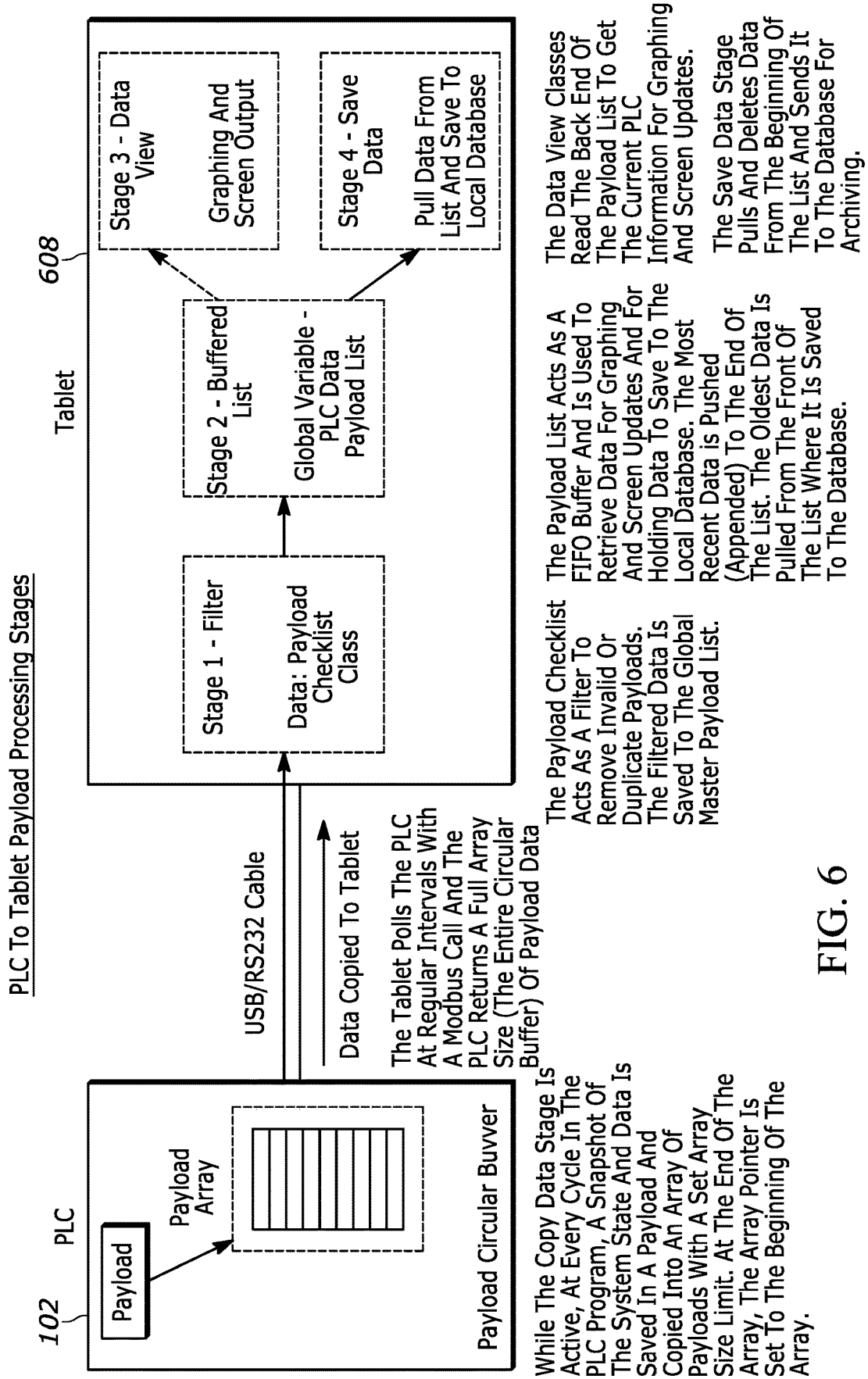
FIG. 6 is a diagram demonstrating processing of incoming payload data with TRTP in accordance with one or more embodiments.

FIG. 6 is a diagram demonstrating processing of incoming payload data with TRTP in accordance with one or more embodiments. It is appreciated that the diagram is provided as merely an example and for illustrative purposes and that suitable variations and other approaches are contemplated.

Processing incoming payload data by the PLC 102 and a tablet 608:

Processing and saving the payload data is handled in coordinated stages.
1. The circular buffer payload array is read in its entirety by the tablet 608 by the Read Updates From PLC class.
2. The returned buffer contents are passed into the PLC Data Payload CheckList class which filters the payload data.
3. The filtered payload data is combined with a test ID and added to a global master list of data by the PLC Data Payload List structure.
4. The Run Test Fragment class uses the Read Updates From PLC class to retrieve the most current payload and use it to monitor the test progress, update screens and graph the data.
5. A Save PLC Data Payload To Database class is run as a background thread from Main Activity and it pulls payload data from the beginning of the master list and saves it to the database.

Figure 7:
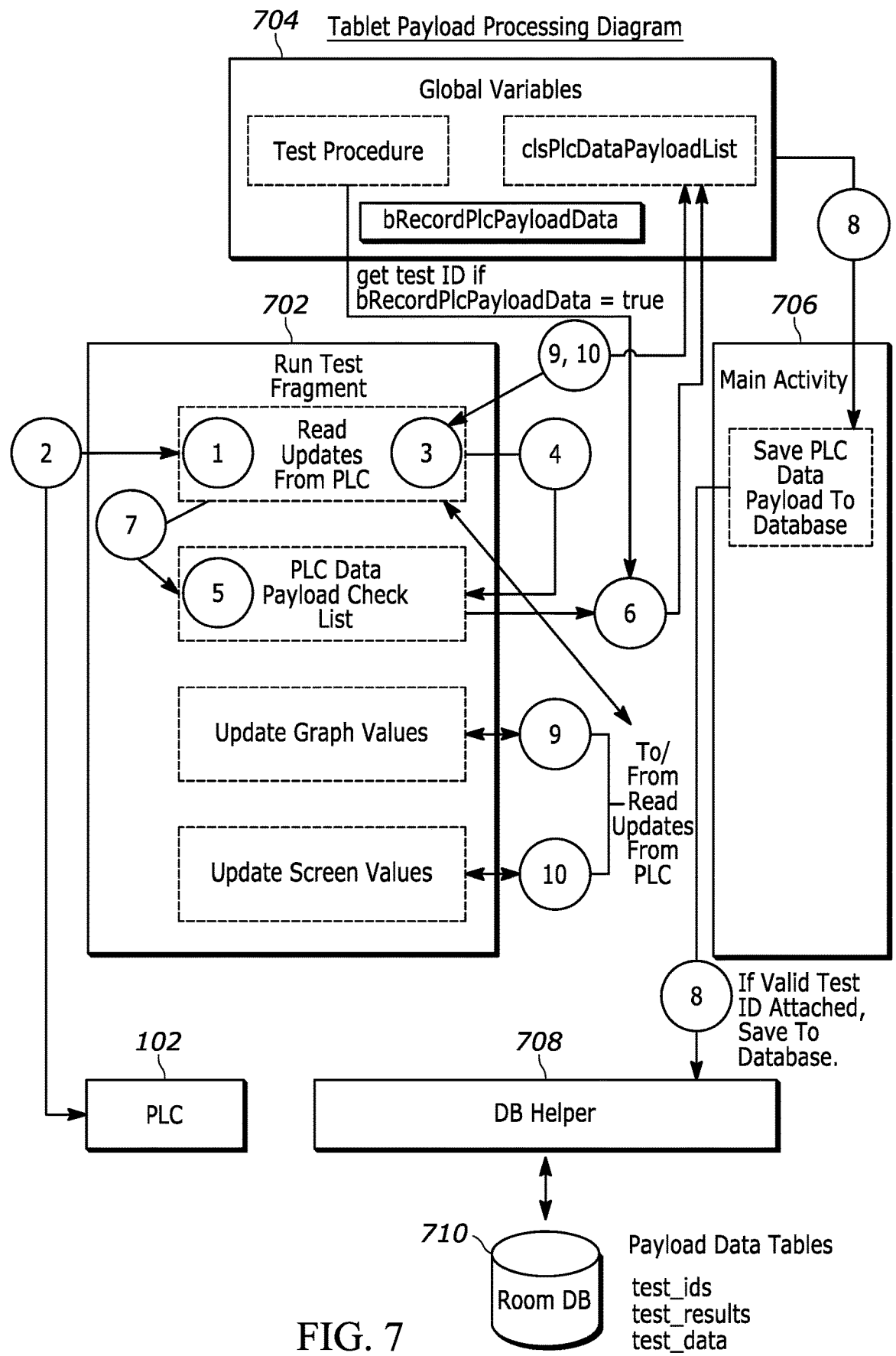
FIG. 7 is a diagram demonstrating tablet payload processing with TRTP in accordance with one or more embodiments.

FIG. 7 is a diagram demonstrating tablet payload processing with TRTP in accordance with one or more embodiments. It is appreciated that the diagram is provided as merely an example and for illustrative purposes and that suitable variations and other approaches are contemplated.

The diagram includes global variables 704, run test fragment(s) 702, main activity 706, database helper 708, a room database 710 and the PLC 102.

Tablet code payload processing detail:
1. Run Test Fragment starts the background thread class Read Updates From PLC
2. Read Updates From PLC polls the PLC at regular intervals and runs the Modbus Helper command readDataPayloadArray( )
3. If the returned payload array is not null and contains data, then it is processed.
4. The payload array is added to a class called PLC Data Payload Checklist whose purpose is to filter the incoming payload array for invalid and duplicate values.
5. PLC Data Payload Checklist will process the incoming array of payloads and remove any invalid, blank, or duplicate payloads. It then saves the time stamps to its own internal list of time stamps that it uses to check for duplicate entries.
6. From within Read Updates From PLC, the filtered payload data is retrieved from the PLC Data Payload Checklist and added to a global master list of PLC data payloads called clsPlcDataPayloadList. This master list of payloads is used as a buffer to load payload data to the local database by a separate thread and to retrieve current payload information for graphing. When adding the payloads to the list, a structure of the payload and a test ID is created. A unique test ID is generated for each test operation.
7. From within Read Updates From PLC, a call is made to the PLC Data Payload Checklist to drop the oldest time stamps. This keeps the look up list of time stamps short to minimize processing time searching for duplicate payload entries.
8. In Main Activity, there is a background thread running, the Save PLC Data Payload To Database class. Its job is to retrieve payloads from the beginning of the master payload list in blocks, check for a valid test ID, and save the payloads to the local database if there is a valid test ID.
9. In Run Test Fragment, there is a thread called Update Graph Values. Its purpose is to loop in the background and call function Update Graph. Update graph calls on method getCurrentPayload( ) of the Read Updates From PLC class, to pull the latest payload from the master payload list and create a new copy of that payload. The copied payload is passed to the graphing library for graphing purposes.
10. Also in Run Test Fragment, the Read Updates From PLC class is queried often for the most recent payload to monitor test progress and update screen values.

It is appreciated that suitable variations are contemplated to the above example implementation.

Figure 8:
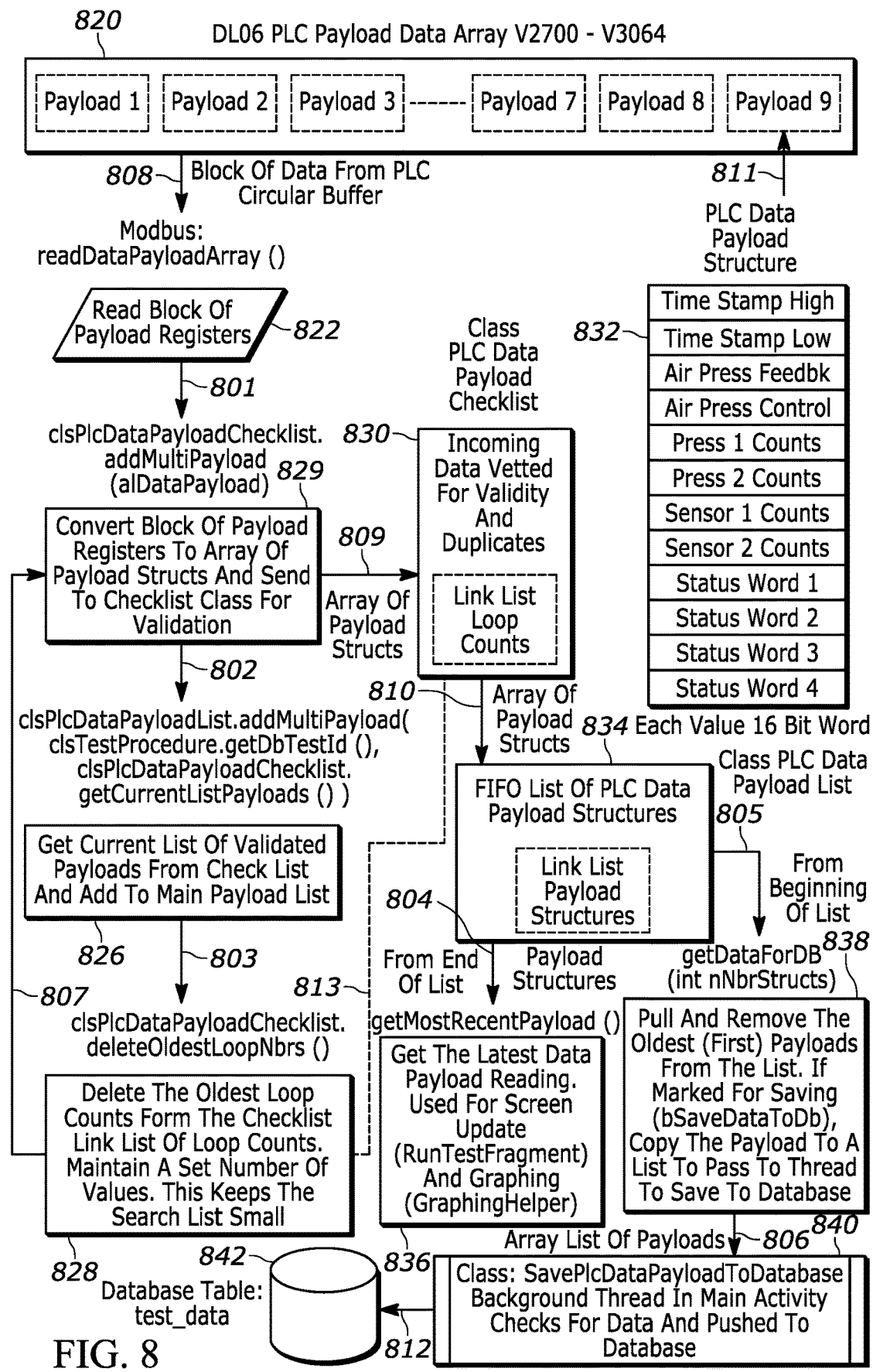
FIG. 8 is a diagram further demonstrating tablet payload processing with TRTP in accordance with one or more embodiments.

FIG. 8 is a diagram further demonstrating tablet payload processing with TRTP in accordance with one or more embodiments. It is appreciated that the diagram is provided as merely an example and for illustrative purposes and that suitable variations and other approaches are contemplated.

The diagram shown in FIG. 8 graphically shows the interaction between main classes and threads and function calls.

FIG. 8 includes a PLC payload data array 820, a read block of payload registers 822, convert block 829, get current list 826, clsPlcDataPayloadChecklist 828, class PLC DataPayloadChecklist 830, class PLC data payload list 834, PLC data payload structure 832, generate latest data 836, class SavePicDataPayloadToDatabase 840, and getDataForDB 838.

Figure 9:
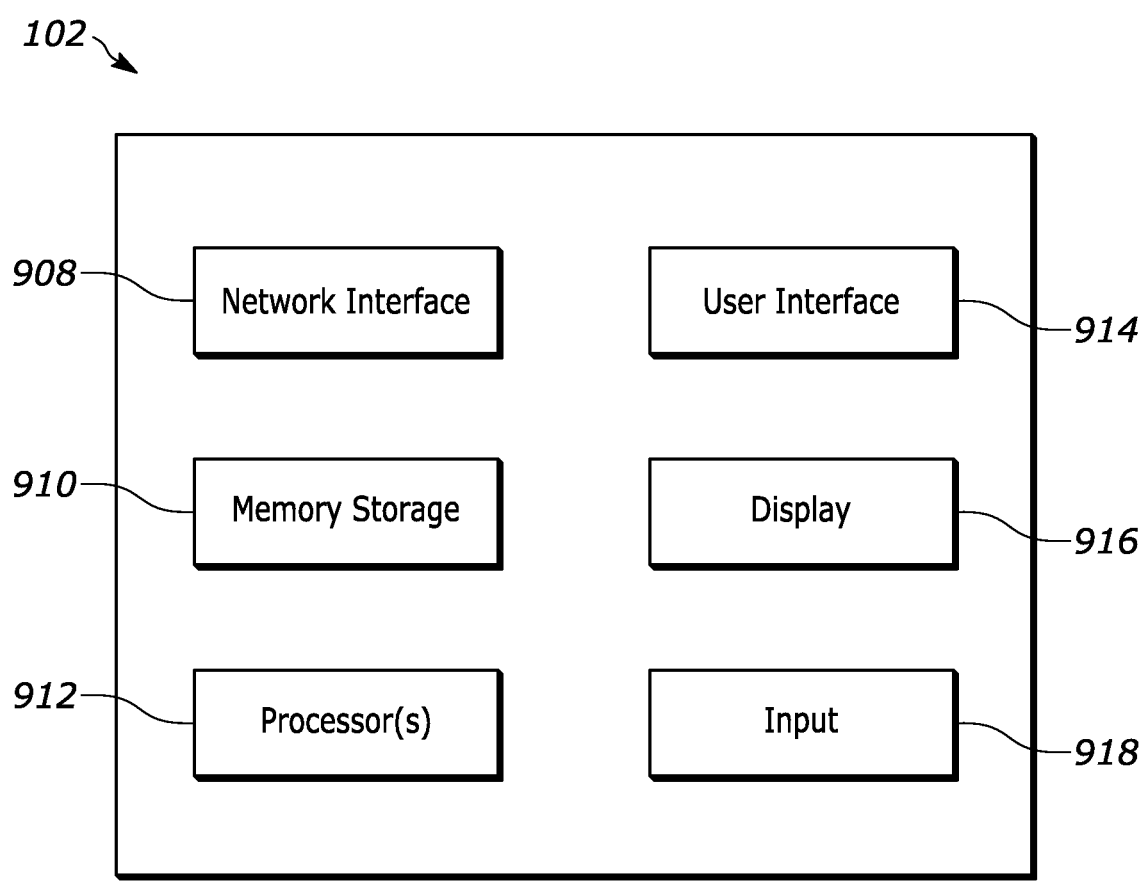
FIG. 9 is a diagram illustrating a testbench circuitry/PLC 102 in accordance with one or more embodiments.

FIG. 9 is a diagram illustrating a testbench circuitry/PLC 102 in accordance with one or more embodiments. The circuitry 102 is depicted for illustrative purposes and it is appreciated that other elements/components are contemplated.

The circuitry 102 is shown with a network interface 908, a memory storage 910, one or more processors 912, a user interface 914, a display 916 and an input device 918.

The network interface 908 is an interface to a transmitter/receiver/transceiver and can be coupled to a network, such as a cloud network, 5G, 3G, the Internet, and the like.

The network interface 908 is configured to receive and/or send information via a network.

The network interface 908 can be coupled to a transceiver (not shown.

The memory 910 can be a volatile and/or non-volatile memory.

The one or more processors 912 are to configured to generate and analyze communications using the TRTP.

The user interface 914 is connected to the processor 912, the memory storage 910 and/or the network interface 908. The user interface 914 can provide or display test results and the like. Additionally, the user interface 914 can receive input information related to the hose assembly, such as hose characteristics, fitting size, test results and the like.

In one example, the user interface 914 includes the display 916 and the input device 918.

It is noted that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the steps, blocks and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It is appreciated that the various aspects/embodiments can utilize short-range communication, such as near field communication (NFC). The NFC standard related to the radiofrequency identification (RFID) standard describes a communication protocol for transmitting information between two devices.

An RFID tag can be used, which includes a radio transponder; a radio receiver and transmitter. When triggered by an electromagnetic interrogation pulse from a nearby RFID reader device, the RFID tag transmits digital data, such as an identifying number, back to the reader. Passive RFID tags are powered by energy from the RFID reader's interrogating radio waves. Active RFID tags are powered by a battery and thus can be read at a greater range from the RFID reader; up to hundreds of meters. Unlike a barcode, the tag doesn't need to be within the line of sight of the reader, so it may be embedded in the tracked object. RFID is one method of automatic identification and data capture (AIDC). It is appreciated that the various aspects/embodiments can utilize RFID tags and/or other techniques of AIDC.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various examples are provided, however it is appreciated that suitable variations are contemplated.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus, system, and the like to perform the actions.

One general aspect includes a system for communicating hose test information using a test results transfer protocol (TRTP). The system also includes a network interface. The system also includes a memory storage. The system also includes one or more processors configured to: initialize a plurality of status words according to the TRTP, generate a payload array configuration having a number of payloads in a payload array and a number of registers, generate the payload array having hose test result information according to the TRTP, and provide the generated payload array to the network interface for transmission.

Implementations may include one or more of the following features. The hose test result information may include a time stamp. The hose test result information may include a plurality of sensor measurements. The hose test result information may include a plurality of pressure measurements. The hose test result information may include air pressure control information. The hose test result information may include air pressure feedback. The one or more processors are configured to: receive a payload array from the network interface; store the received array into a receive buffer; filter the received array; combine the filtered array with a global list; generate test progress; and provide the test progress to a display interface. The hose test result information has test settings that may include one or more of key pressure points, timing information, and test type. The host test result information having machine settings may include one or more of pump system identification, pump, transducer and converter properties. The TRTP may include count to unit conversion coefficients. The TRTP may include tare pressure and calibration coefficients. The system the hose information may include model, fittings, diameter and length. The hose test result information has vendor and customer information and may include one or more of part numbers, work order, purchase order number, vendor and customer. The hose test result information has serial and lot information. The one or more processors are configured to load/transfer/exchange tests and test data into other test machines or software programs. The hose test result information having vendor specific messaging formats. The hose test result information having machine specific messaging formats. The hose test result information having vendor data interchange formats. The one or more processors may include in a programable logic controller (PLC) industrial computer. Implementations of the described techniques may include hardware, a method or process, or computer software on a computer-accessible medium.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for communicating hose test information using a test results transfer protocol (TRTP), the system comprising:
   a network interface;
   a memory storage; and
   one or more processors configured to:
      initialize a plurality of status words according to the TRTP;
      generate a payload array configuration having a number of payloads in a payload array and a number of registers;
      generate the payload array having hose test result information according to the TRTP;
      the payloads each comprise a payload time stamp, air pressure feedback, air pressure control and one or more payload status words of the plurality of status words; and
      provide the generated payload array to the network interface for transmission.

2. The system of claim 1, the hose test result information comprising a time stamp.

3. The system of claim 1, the hose test result information comprising a plurality of sensor measurements.

4. The system of claim 1, the hose test result information comprising a plurality of pressure measurements.

5. The system of claim 1, the hose test result information comprising air pressure control information.

6. The system of claim 1, the hose test result information comprising air pressure feedback.

7. The system of claim 1, the one or more processors configured to:
   receive a payload array from the network interface;
   store the received array into a receive buffer;
   filter the received array;
   combine the filtered array with a global list;
   generate test progress; and
   provide the test progress to a display interface.

8. The system of claim 1, the hose test result information having test settings comprising one or more of key pressure points, timing information, and test type.

9. The system of claim 1, the host test result information having machine settings comprising one or more of pump system identification, pump, transducer and converter properties.

10. The system of claim 1, the TRTP comprising count to unit conversion coefficients.

11. The system of claim 1, the TRTP comprising tare pressure and calibration coefficients.

12. The system of claim 1, the hose information comprising model, fittings, diameter and length.

13. The system of claim 1, the hose test result information having vendor and customer information comprising one or more of part numbers, work order, purchase order number, vendor and customer.

14. The system of claim 1, the hose test result information having serial and lot information.

15. The system of claim 1, the one or more processors configured to load/transfer/exchange tests and test data into other test machines or software programs.

16. The system of claim 1, the hose test result information having vendor specific messaging formats.

17. The system of claim 1, the hose test result information having machine specific messaging formats.

18. The system of claim 1, the hose test result information having vendor data interchange formats.

19. The system of claim 1, the one or more processors comprised in a programmable logic controller (PLC) industrial computer.

20. The system of claim 1, further comprising a network storage and a plurality of nodes.

* * * * *